Jan. 24, 1939.  K. L. DYNES  2,145,083
TIME CLOCK MECHANISM
Filed Dec. 2, 1937
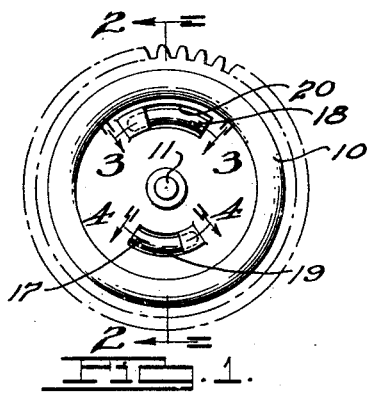
FIG. 1.
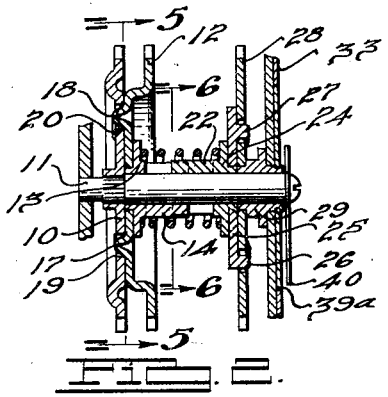
FIG. 2.
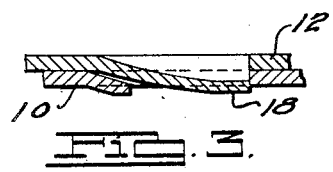
FIG. 3.
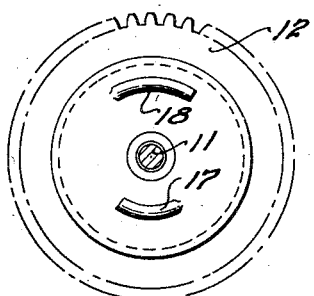
FIG. 5.
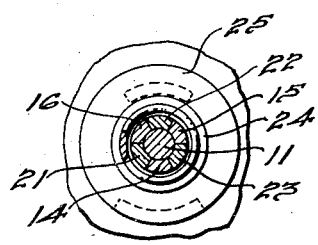
FIG. 6.
FIG. 4.
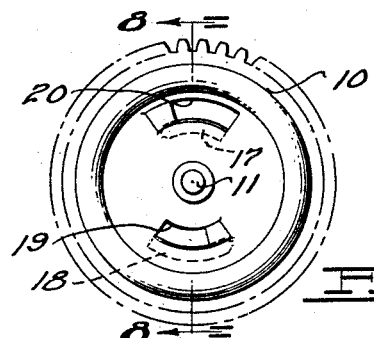
FIG. 7.
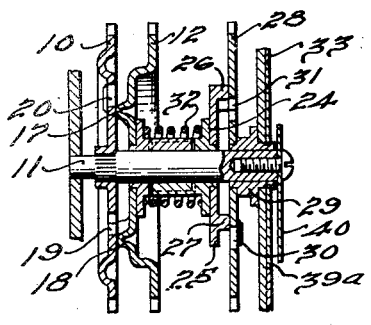
FIG. 8.
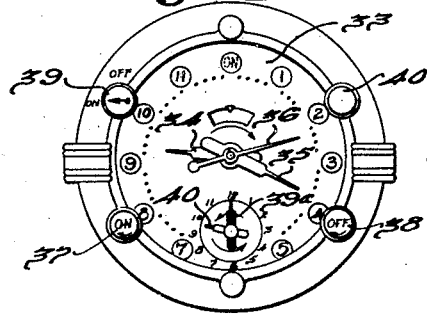
FIG. 9.
INVENTOR
Kenneth L. Dynes,
BY Wm Edward Hann
ATTORNEY Patented Jan. 24, 1939

2,145,083

UNITED STATES PATENT OFFICE 2,145,083

TIME CLOCK MECHANISM

Kenneth L. Dynes, Los Angeles, Calif., assignor to Grayson Heat Control, Ltd., Lynwood, Calif., a corporation of California Application December 2, 1937, Serial No. 177,773

6 Claims. (Cl. 161—1)

This invention relates to time clock mechanism of the type shown and described in the co-pending application of John H. Grayson, Serial No. 146,705, filed June 7, 1937, and is particularly useful for controlling the turning "on" and "off" of power for domestic cooking stoves.

The main objects of this invention are to provide an improved construction of relatively rotatable and axially slidable mechanical elements which will function with a minimum tendency to bind or produce frictional resistance to movement; to provide a construction in which the forces are equally and uniformly distributed on the supporting surfaces whereby the parts will move freely and easily; to provide a construction in which the wear will be reduced to a minimum thereby insuring long life to the parts; to provide a construction in which malfunction due to binding friction is eliminated, and to provide a construction in which free, smooth and accurate functioning is insured over a long period of time.

An illustrative embodiment of this invention is shown in the accompanying drawing, in which:

Fig. 1 is a plan view of the manually set gear showing the cam openings in the sides thereof, and with the time driven cams therein;

Fig. 2 is a sectional view taken on the line 2—2 of Fig. 1;

Fig. 3 is an enlarged fragmentary sectional view taken on the arcuate line 3—3 of Fig. 1;

Fig. 4 is an enlarged fragmentary sectional view taken on the arcuate line 4—4 of Fig. 1;

Fig. 5 is a view taken generally along the line 5—5 of Fig. 2 looking in the direction indicated by the arrows, and showing in plan view the time driven gear;

Fig. 6 is a sectional view taken on the line 6—6 of Fig. 2;

Fig. 7 is a view similar to Fig. 1 but with the gears rotated 180° to show the relationship of the cams to the cam openings when in that position;

Fig. 8 is a sectional view taken on the line 8—8 of Fig. 7, and

Fig. 9 is a view in elevation of a time clock of the character in which this improved mechanism is particularly useful.

In the above mentioned co-pending application where the similar parts are used but with a single cam it has been found that a binding action results, which at times causes malfunction of the mechanism in addition to which excessive wear takes place on the parts.

In the present construction due to the fact that two cams are provided at diametrically opposite sides of the axis, there is no tendency whatever to bind during the axial sliding movement and as a result the mechanism functions not only in a satisfactory manner, but with very little wear thus insuring a long life to the parts.

Furthermore, by having the split sleeves which form the driving connection between the operating parts so constructed that the parts present a uniform area to surface contact, very little binding action or resistance to axial sliding is encountered.

In the construction shown in the drawing a manually operable set gear 10 is shown rigidly secured at its hub to a shaft 11 in the same manner as is more fully shown and described in the above identified Grayson application, reference to which is made for a more complete and detailed description of the time clock mechanism in which this improved invention is used. A relatively rotatable time driven gear 12 is rigidly staked to a hub 13 which is journaled on the shaft 11 closely adjacent to the set gear 10, and axially slidable thereon.

The hub 13 is provided with an axially extending sleeve which has portions thereof cut out to form three axially extending fingers 14, 15 and 16, which are of the same size and which have equal and uniform amounts of bearing area contact surface on the shaft 11.

The side of the gear 12 adjacent to the set gear 10 is provided with a pair of cams 17 and 18, which are positioned at different radial distances from the axis of rotation of the gears, and which are of the same height. The cams 17 and 18 are adapted to bear against the adjacent side of the set gear 10, and thus hold the gears in axially spaced relation except when in one angular relationship. The set gear 10 is provided with a pair of complementary cam openings 19 and 20 respectively, for receiving the cams 17 and 18 when in one angular position with respect thereto.

As shown most clearly in Figs. 3 and 4, the cams 17 and 18 are so positioned and arranged with respect to their respective cam openings that both cams will enter their respective openings at identically the same moment. By having the cams 17 and 18 of equal height and spaced equi-angularly with respect to the axis of rotation, it will be clearly apparent that axial force exerted by one gear upon the other through the medium of the cams will be evenly distributed and eliminate any tendency whatever for the hubs 13 and fingers carried thereby to bind upon the shaft 11 when slid axially thereon.

The fingers 14, 15 and 16 are adapted to mate with and drive a complementary set of similar fingers 21, 22 and 23 respectively, which are integrally formed on a hub 24 to which is rigidly staked a cam disc 25, which is rotated by the time driven gear 12 through the interengaging fingers.

The outer side of the disc 25 is provided with a pair of cams 26 and 27 which are spaced equi-angularly about the axis of rotation and which are of the same height but which are spaced unequal distances radially from the center. A manual set gear 28 is rigidly staked to a hub 29 which is journaled on the shaft 11 with the set gear 28 adjacent to the cam disc 25. The set gear 28 is provided with a pair of complementary cam openings 30 and 31 positioned so as to receive, at identically the same moment, the cams 26 and 27 respectively. Due to the different distances that the cams 26 and 27 and their respective cam openings 30 and 31 are spaced from the center, the cams will enter their complementary openings at only one point in a complete revolution.

Means are provided for urging the gear 12 and disc 25 axially in opposite directions so as to cause their respective cams to enter their cam openings and comprises a helical compression spring 32 which surrounds the axial extending interengaged fingers 14, 15, 16, 21, 22 and 23, in slightly spaced relation thereto and the opposite ends of which abut against the respective hubs of the gear 12 and disc 25. The spring 32 tends to insure the movement of the parts from the position shown in Fig. 8 of the drawing to the position shown in Fig. 2 of the drawing wherein the respective cams are entered into their complementary cam openings.

As shown in Fig. 9 of the drawing the time clock in which this improved mechanism is used is of the type shown and illustrated in the heretofore identified application and includes the usual clock face 33, hour hand 34, minute hand 35 and second hand 36. Control knobs 37 and 38 are also provided for setting the hands 39a and 40, respectively, which indicate the respective times at which the operating mechanism turns "on" and "off". Other control knobs 39 and 40 are illustrated but form no part of the invention herein described and shown.

In the operation of this mechanism the set hands 39a and 40 are moved by their respective control knobs 37 and 38 to indicate the times at which the mechanism is intended to turn "on" and "off". Rotation of the control knobs 37 and 38 through appropriate mechanism will rotate the manual set gears 12 and 28 to the required position at which time the respective cams will ride on the adjacent faces of the gears 10 and 20 as illustrated in Fig. 8 of the drawing.

When the time clock mechanism rotates the time driven gear 12 to the point set off on the dial the cams 17 and 18 thereon will enter into the respective cam openings 19 and 20 of the gear 10 at which time the helical spring 32 will slide the time driven gear 12 axially to the left to the position shown in Fig. 2 of the drawing. Other mechanism not illustrated herein but shown in detail in the heretofore identified copending application will be caused to function by such axial movement.

Further rotation of the time gear 12 will cause the cam disc 25 to be rotated, through the medium of the interengaging fingers 14, 15, 16, 21, 22 and 23, to a position whereby the cams 26 and 27 thereon will come in registry with their respective cam openings 30 and 31, at which time the helical compression spring 32 will likewise cause axial movement to the right as viewed in Fig. 8 and cause the disc 25 to move from the position shown in Fig. 8 to that shown in Fig. 2 of the drawing. This axial movement likewise operates mechanism not illustrated herein to turn "off".

Due to the provision of a plurality of cams equi-angularly spaced about the axis of rotation which cams are of the same height and bear equally against the respective sides of their adjacent gears, binding friction is reduced to a minimum and wear is very materially reduced, thus insuring long life to the operating parts. Elimination of wear and binding friction is also aided by having the interengaging fingers equi-angularly spaced and of equal area or bearing contact on their respective supporting surfaces. Smooth and proper functioning of the parts is also aided and assisted by the helical compression spring 32 which tends to cause the parts to operate promptly upon reaching their respective positions.

Although but one specific embodiment of this invention has been herein shown and described, it will be understood that numerous details of the construction shown may be altered or omitted without departing from the spirit of this invention as defined by the following claims.

I claim:

1. In a time clock mechanism, a pair of adjacent co-axial relatively rotatable members journaled to permit relative axial movement, one of said members having a plurality of cams for engaging the adjacent side of said other member, said other member having a plurality of complementary cam openings for simultaneously receiving said cams, said cams being spaced different axial distances, whereby entrance of said cams into said openings may occur at but one angular position.

2. In a time clock mechanism, a set gear, a time driven gear journaled adjacent to and co-axially with said set gear, a plurality of cams on one of said gears for bearing against the adjacent side of the said other gear, said other gear having complementary cam openings therein, said cams and openings being positioned at different radial distances from the axis of rotation whereby registration of complementary cams and openings will occur in but one angular position, said cams being substantially equi-angularly spaced and of substantially the same height, whereby axial force exerted by one gear upon the other will be evenly distributed.

3. In a time clock mechanism, a rotatable member adapted to be set manually to predetermined position, a second rotatable member journaled adjacent to and co-axially with said first mentioned member and adapted to be rotated by clock mechanism, a plurality of cams on the adjacent side of one of said members for contacting the other of said members and holding said members in axially spaced relation when in certain angular relation, said other member having companion openings therein for permitting axial movement of one of said members toward the other when in other certain angular relation, said cams being located at different distances from the axis of the said members whereby registration of said cams with their respective cam openings will occur in but one angular position.

4. In a time clock mechanism, a pair of co-axially journaled relatively rotatable members positioned in adjacent parallel planes, one of said members having a pair of openings therein located at substantially diametrically opposite positions, a pair of cams on said other member adapted to enter said openings simultaneously, said cams and openings being positioned at varying radial distances from the axis of rotation whereby registration will occur in but one angular position.

5. In a time clock mechanism, a pair of adjacent co-axial relatively rotatable members journaled to permit relative axial movement, a plurality of cams on one of said members for bearing against the adjacent side of the said other member, said other member having complementary cam openings therein, said cams being substantially equi-angularly spaced and of substantially the same height, whereby axial force exerted by one member upon the other through the medium of said cams will be evenly distributed, said cams and cam openings being arranged so that registry thereof will occur at only one angular position.

6. In a time clock mechanism, a shaft, a set gear rigid on said shaft, a time driven gear member journaled and axially slidable on said shaft, a cam on the side of one of said gears, the other of said gears having a cam opening adapted to receive said cam when in registry therewith, a second member journaled and axially slidable on said shaft, a second set gear member on said shaft, one of said last mentioned members having a cam opening, a cam on the other adapted to enter said opening when in registry therewith, means connecting said axially slidable members being directly connected for imparting rotation one to the other in the same direction while permitting relative axial movement, and a helical compression spring bearing between said axially slidable members for yieldingly urging axial movement thereof in opposite directions.

KENNETH L. DYNES.